(12) United States Patent
Hasegawa et al.

(10) Patent No.: US 6,720,676 B2
(45) Date of Patent: Apr. 13, 2004

(54) IN-VEHICLE ELECTRIC POWER SUPPLY APPARATUS

(75) Inventors: Tetsuya Hasegawa, Shizuoka (JP); Yasuhiro Tamai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/319,619

(22) Filed: Dec. 16, 2002

(65) Prior Publication Data
US 2003/0137786 A1 Jul. 24, 2003

(30) Foreign Application Priority Data
Jan. 18, 2002 (JP) ...................................... P2002-010743

(51) Int. Cl.$^7$ ................................................. H02J 1/10
(52) U.S. Cl. ................................. 307/85; 361/2; 363/63
(58) Field of Search ................................. 323/275, 276; 307/29, 43, 10.1, 69, 80, 85, 86; 361/2; 363/63

(56) References Cited

U.S. PATENT DOCUMENTS 5,886,888 A * 3/1999 Akamatsu et al. ............ 363/65
6,154,383 A * 11/2000 Cardwell, Jr. ................ 363/71
6,184,593 B1 * 2/2001 Jungreis ........................ 307/64

* cited by examiner

*Primary Examiner*—Jessica Han
(74) *Attorney, Agent, or Firm*—Sughrue Mion, PLLC

(57) ABSTRACT

An arc preventing circuit 12 is disposed between a DC/DC converter 6 and a battery (of 36 volts or 12 volts). In the arc preventing circuit 12, when the DC/DC converter 6 and the battery are to be connected to each other, the connection is performed via a circuit having a resistor R1, and then switched to that in which the connection is performed via a circuit not having the resistor R1. When the DC/DC converter 6 and the battery are to be disconnected from each other, the charging voltage of a capacitor C1 of the DC/DC converter 6 is discharged. According to the configuration, arc generation can be prevented from occurring during works of mounting and dismounting the DC/DC converter.

7 Claims, 11 Drawing Sheets

IN-VEHICLE ELECTRIC POWER SUPPLY APPARATUS

BACKGROUND OF THE INVENTION

The present invention relates to an electric power supply apparatus which is to be mounted on a vehicle, and more particularly to a technique of improving the safety during maintenance.

Recently, attempts to increase the voltage of a battery which is to be mounted on a vehicle and use a power supply of about 36 volts in place of a 12-volt power supply that is conventionally used have been made. In the case where a 36-volt battery is used, a system in which 36-volt and 12-volt loads are mixedly used because it is difficult to change standards of all of various loads to be mounted on a vehicle to those suitable for 36 volts, and the 12-volt loads are driven by a voltage that is obtained by converting 36 volts DC into 12 volts is employed.

FIG. 11 is a circuit diagram showing a conventional example of such a power supply apparatus. As shown in the figure, in the power supply apparatus 101, an AC voltage output from a generator (M/G) 102 is converted into a DC voltage by a rectifier (AC/DC) 103. An output terminal of the rectifier 103 is connected to a 36-volt load 104, a 36-volt battery 105, and a DC/DC converter 106 via junction boxes (J/B) 107 and 108.

The DC/DC converter 106 converts a DC voltage of 36 volts into a DC voltage of 12 volts. An output terminal of the converter is connected to a 12-volt battery 110 and a 12-volt load 111 via a junction box 109.

According to the configuration, the AC voltage output from the generator 102 is converted into a DC voltage of 36 volts by the rectifier 103, and then supplied to the 36-volt load 104 and the 36-volt battery 105. Therefore, the 36-volt load 104 can be driven and the 36-volt battery 105 can be charged.

Thereafter, the voltage is lowered to 12 volts by the DC/DC converter 106. The voltage of 12 volts is supplied to the 12-volt load 111 and the 12-volt battery 110, so that the 12-volt load 111 can be driven and the 12-volt battery 110 can be charged.

In the conventional power supply apparatus 101, there is a case where, when a power supply wire through which the DC/DC converter 106 is to be coupled to the battery 105 or 110 is connected to or disconnected from the battery, an arc (spark) is generated in a connecting portion. For example, an arc may be generated in the following situations.

(A) When a connection is made or broken in such a connecting portion under a voltage applied state (on-load state), an arc is generated in the portion. The arc is greater in degree as the voltage is higher.

(B) In the case where the DC/DC converter 106 is not used for a long time period or is initially operated, an internal capacitor of the DC/DC converter 106 has a charging voltage of about 0 volt. In such a case, when a power supply wire is connected to the converter, a current of the voltage of the 36-volt battery 105 is flown into the internal capacitor. When the power supply wire is in contact with a terminal, therefore, an arc is generated. The arc is greater in degree as the 36-volt battery is closer to a fully charged state.

(C) In the case where the DC/DC converter 106 has been operated even once, the internal capacitor of the DC/DC converter 106 sometimes remains to be charged by a certain voltage. In such a case, when a terminal of a power supply wire which is connected to the plus terminal of the DC/DC converter 106 is in contact with the vehicle body or another metal part during a work of disconnecting the power supply wire, a short circuit occurs and an arc is generated. In the case where a power supply wire is first connected to the 36-volt battery 105, when the power supply wire is then connected to the DC/DC converter 106, an arc is generated. By contrast, in the case where a power supply wire is first connected to the DC/DC converter 106, when the power supply wire is then connected to the 36-volt battery 105, an arc is generated.

As described above, in the conventional power supply apparatus 101, there is a problem that an arc is generated during a work of connecting or disconnecting a power supply wire in maintenance of the DC/DC converter 106 which is disposed between the high-voltage side (36-volt side) and the low-voltage side (12-volt side).

SUMMARY OF THE INVENTION

The invention has been conducted in order to solve the problem of the conventional art. It is an object of the invention to provide an in-vehicle electric power supply apparatus in which arc generation can be prevented from occurring during a work of connecting or disconnecting a power supply wire that is used between a DC/DC converter and a battery.

(1) In order to attain the object, the invention is characterized in that, in an in-vehicle electric power supply apparatus having: a DC/DC converter for voltage conversion; a power supply circuit which is disposed on a high-voltage side of the DC/DC converter; and a power supply circuit which is disposed on a low-voltage side of the DC/DC converter, an arc preventing unit is disposed between the DC/DC converter and at least one of the power supply circuits, when the DC/DC converter and the power supply circuit are to be connected to each other, the arc preventing unit controls the connection to be performed via a high-resistance circuit of a first resistance, and thereafter changes the connection to be performed via a low-resistance circuit of a second resistance which is lower than the first-resistance, and when the DC/DC converter and the power supply circuit are to be disconnected from each other, the arc preventing unit controls the DC/DC converter to discharge a charging voltage of a capacitor of the DC/DC converter.

(2) The invention is characterized also in that, in an in-vehicle electric power supply apparatus having: a DC/DC converter for voltage conversion; a power supply circuit which is disposed on a high-voltage side of the DC/DC converter; and a power supply circuit which is disposed on a low-voltage side of the DC/DC converter, an arc preventing unit is disposed between the DC/DC converter and at least one of the power supply circuits, and the arc preventing unit has: a first circuit configured by a series connection of a first switch and a first resistor; a second switch which is connected in parallel with the first circuit; a second circuit which is configured by a series circuit of a third switch and a second resistor, and which is connected across terminals of a capacitor of the DC/DC converter; and a controlling unit for, when the DC/DC converter and the power supply circuit are to be connected to each other, controlling the first switch to be turned on, and then controlling the first switch to be turned off and the second switch to be turned on, and for, when the DC/DC converter and the power supply circuit are to be disconnected from each other, controlling the second switch to be turned off and the third switch to be turned on.

(3) The invention is characterized also in that the controlling unit controls the first switch to be turned on when a voltage VB which is applied to a connection terminal of the DC/DC converter is equal to or higher than a first threshold Vth1 after the connection terminal of the DC/DC converter is connected to an output terminal of the power supply circuit, and controls the first switch to be turned off, and the second switch to be turned on when a difference between the voltage VB and a terminal voltage VC of the capacitor of the DC/DC converter is equal to or lower than a second threshold Vth2.

(4) The invention is characterized also in that, when a vehicle ignition is turned off, the controlling unit controls the second switch to be turned off, and then controls the third switch to be turned on.

(5) The invention is characterized also in that, when the terminal voltage VC of the capacitor of the DC/DC converter is equal to or lower than a third threshold Vth3 after the third switch is turned on, the controlling unit controls the third switch to be turned off.

(6) The invention is characterized also in that the apparatus further has an informing unit which, when the third switch is turned on, informs of the turn-on state.

DETAILED DESCRIPTION OF PREFERRED EMBODIMENTS

Hereinafter, embodiments of the invention will be described with reference to the accompanying drawings.

First Embodiment

Figure 1:
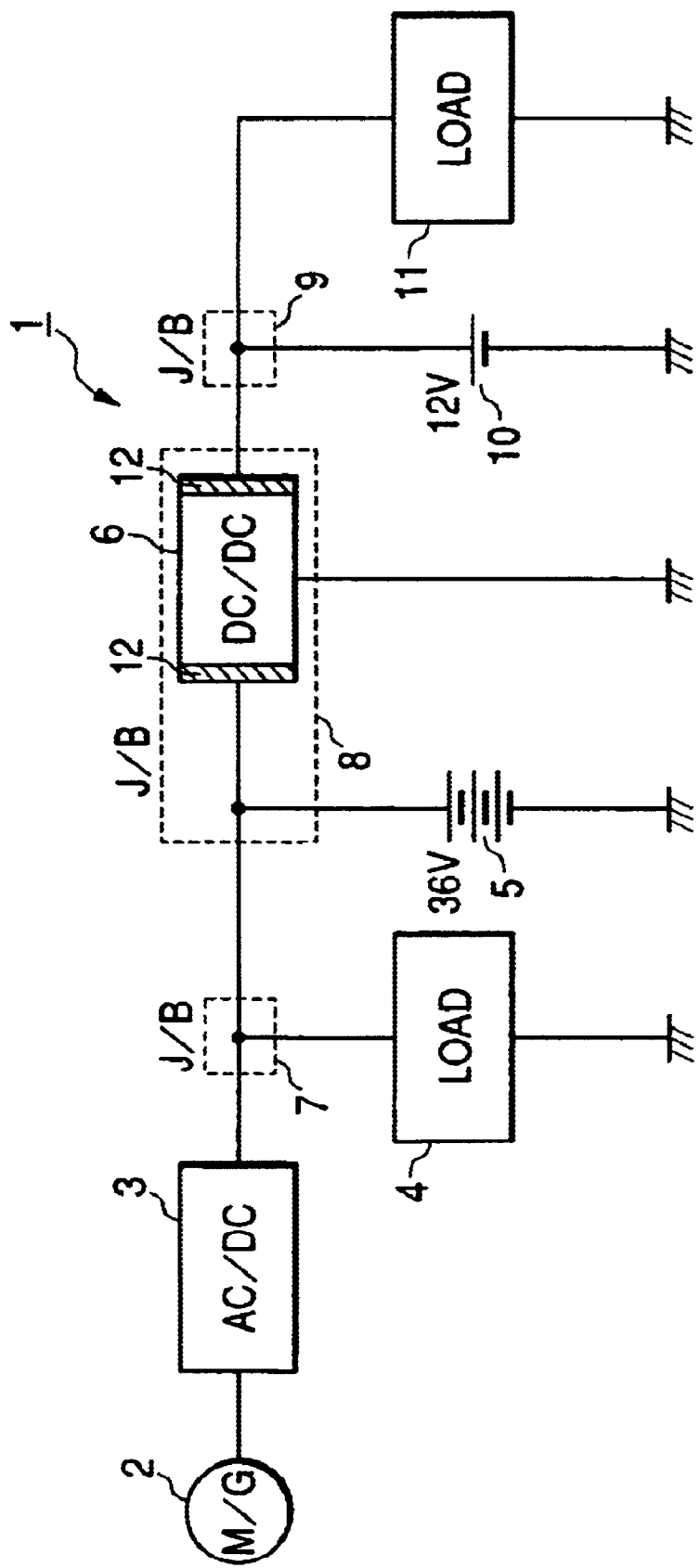
FIG. 1 is a block diagram showing the configuration of an in-vehicle electric power supply apparatus which is a first embodiment of the invention.

FIG. 1 is a block diagram showing the configuration of an in-vehicle electric power supply apparatus which is a first embodiment of the invention. As shown in the figure, the power supply apparatus 1 includes: a generator 2 which generates an AC voltage; a rectifier 3 which converts the AC voltage output from the generator 2 into a DC voltage (36 volts); a 36-volt battery 5 which is charged by the rectified voltage of 36 volts; a DC/DC converter 6 which converts the DC voltage of 36 volts into a DC voltage of 12 volts; a 12-volt battery 10 which is charged by the voltage of 12 volts; and junction boxes 7, 8, and 9.

The DC voltage of 36 volts output from the rectifier 3 is supplied to a 36-volt load 4 which is mounted on a vehicle. The DC voltage of 12 volts output from the DC/DC converter 6 is supplied to a 12-volt load 11.

Figure 2:
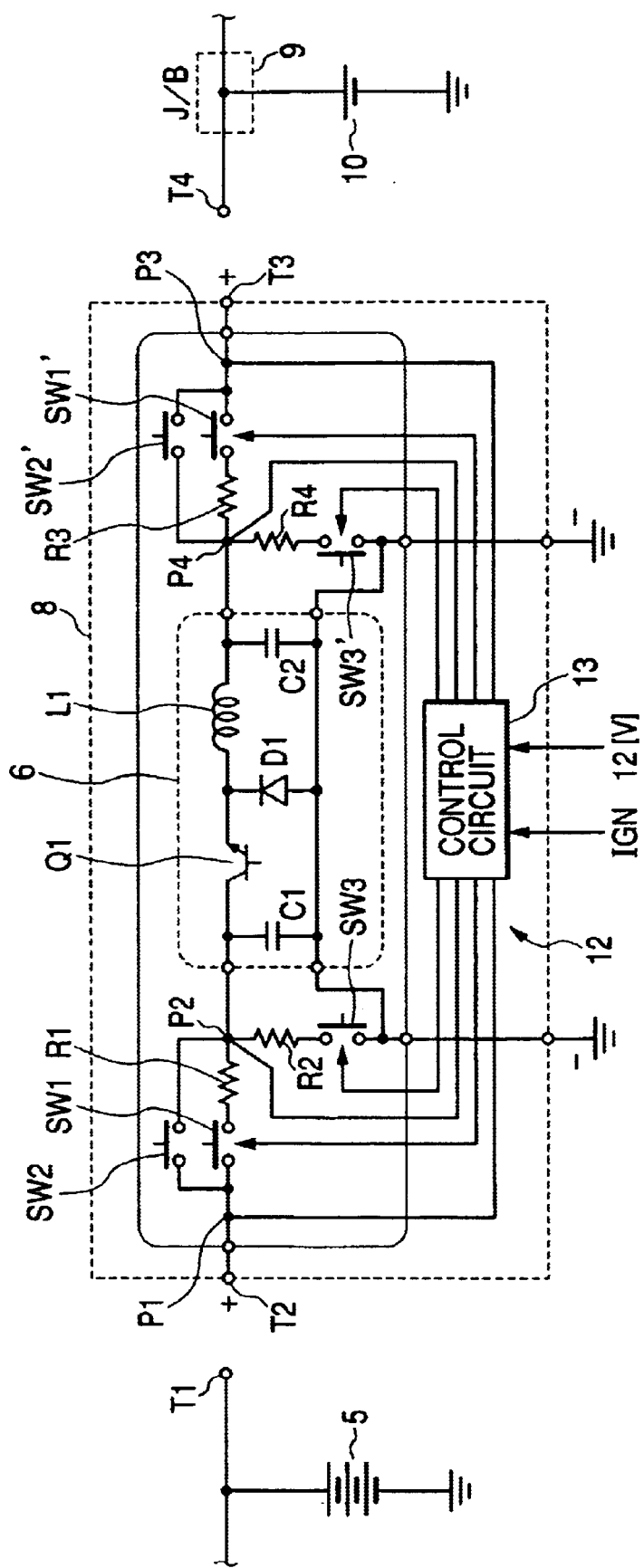
FIG. 2 is a circuit diagram showing in detail the configurations of a DC/DC converter shown in FIG. 1, and devices connected thereto.

FIG. 2 is a circuit diagram showing in detail the internal configuration of the junction box 8. As shown in the figure, in the junction box 8, the DC/DC converter 6 is placed, and an arc preventing circuit (the arc preventing unit) 12 is disposed on each of 36-volt and 12-volt sides of the DC/DC converter 6.

The DC/DC converter 6 shown in the figure has charging capacitors C1 and C2, a diode D1, a choke coil L1, and a switching transistor Q1, and converts the DC voltage of 36 volts supplied from the side of the capacitor C1, into the DC voltage of 12 volts.

One terminal (point P2) of the capacitor C1 is connected to the plus input terminal of the 36-volt battery 5 via a resistor R1 (the first resistor) and a switch SW1 (the first switch). A switch SW2 (the low-resistance circuit, the second switch) is disposed in parallel with the series circuit (the high-resistance circuit, the first switch) of the resistor R1 and the switch SW1. The point P2 is connected to the ground via a resistor R2 (the second resistor) and a switch SW3 (the third switch). The other terminal of the capacitor C1 is connected to the ground.

One terminal (point P4) of the capacitor C2 is connected to the plus input terminal of the 12-volt battery 10 via a resistor R3 (the first resistor) and a switch SW1'. A switch SW2' is disposed in parallel with the series circuit of the resistor R3 and the switch SW1'. The point P4 is connected to the ground via a resistor R4 (the second resistor) and a switch SW3'. The other terminal of the capacitor C2 is connected to the ground.

The resistor R1 is an arc preventing resistor. The resistor R1 is disposed in a path through which a current flows from the 36-volt battery 5 into the capacitor C1 of the DC/DC converter 6, thereby preventing an arc from being generated when the DC/DC converter 6 and the 36-volt battery 5 are connected to each other by a power supply wire.

As the resistance of the resistor R1 is lower, the capacitor C1 can be charged more rapidly, and, as the resistance is higher, arc generation can be prevented more effectively from occurring.

The on/off operations of the switches SW1 to SW3 and SW1' to SW3' are controlled by a control circuit 13. The control circuit 13 detects voltages appearing at a point P1 (the voltage of the 36-volt battery 5), the point P2 (the charging voltage of the capacitor C1), a point P3 (the voltage of the 12-volt battery 10), and the point P4 (the charging voltage of the capacitor C2). The control circuit 13 is supplied with an on/off signal of an ignition (IGN) of the vehicle, and driven by the voltage of 12 volts which is always supplied.

FIG. 2 shows an example in which a non-isolated DC/DC converter is used. Alternatively, an isolated DC/DC converter may be used. The switches SW1 to SW3 and SW1' to SW3' may be configured by switches of various types such as relays, semiconductor switches, or mechanical switches. In FIG. 2, the arc preventing circuits 12 are disposed in the junction box 8 on the 36-volt side. Alternatively, the circuits may be disposed in the junction box 9 on the 12-volt side.

Figure 7:
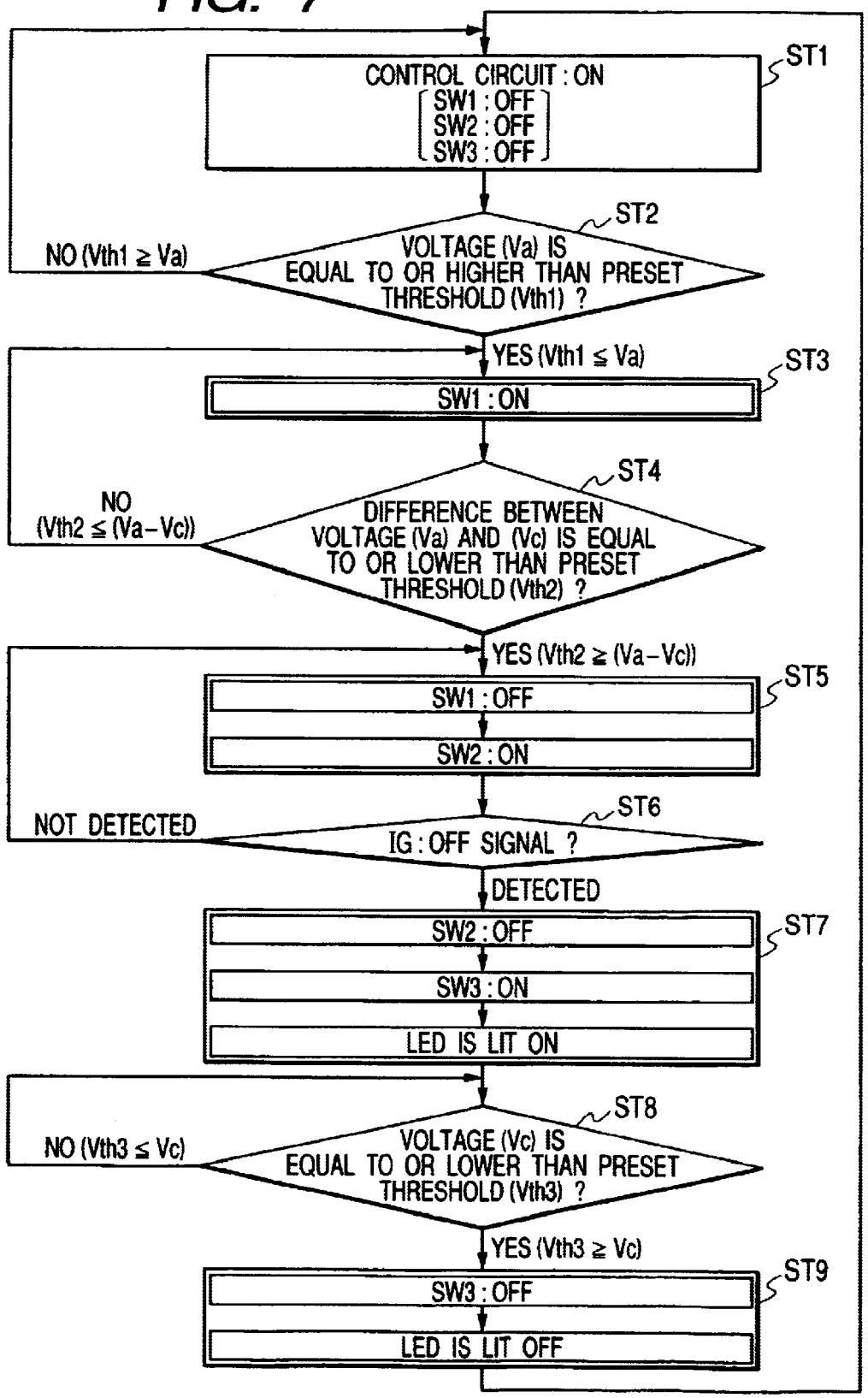
FIG. 7 is a flowchart showing the operation of the in-vehicle electric power supply apparatus of the first embodiment of the invention.

Next, the operation of the thus configured power supply apparatus 1 of the embodiment will be described with reference to a flowchart shown in FIG. 7.

FIG. 2 shows the state where a connection terminal T2 on the 36-volt side of the DC/DC converter 6 is disconnected from a terminal Ti of the 36-volt battery 5, and a connection terminal T3 on the 12-volt side of the DC/DC converter 6 is disconnected from a terminal T4 of the 12-volt battery 10.

At this time, all of the switches SW1 to SW3 and SW1' to SW3' of the arc preventing circuits 12 are in the off state (step ST1). The arc preventing circuit 12 on the 36-volt side operates in the same manner as that on the 12-volt side (namely, the operations of the left-side and right-side circuits with respect to the DC/DC converter 6 in the figure are identical with each other). In the following description, therefore, emphasis is placed on the operation of the circuit on the 36-volt side. The switches SW1 to SW3 and SW1' to SW3' are not operated in an interlocked manner.

When the 36-volt battery 5 is to be connected to the DC/DC converter 6 in the state of step ST1, the terminals T1 and T2 are connected to each other. In this state, the switches SW1 to SW3 are not yet turned on. The output voltage VB of the 36-volt battery 5 (the voltage of the point P1) is applied to the control circuit 13, and the voltage VB is compared in level with a preset threshold (the first threshold) Vth1 (step ST2). The value of the threshold Vth1 can be adequately changed in accordance with the kinds of the batteries, the DC/DC converter, and the system of the vehicle on which the apparatus is mounted.

Figure 3:
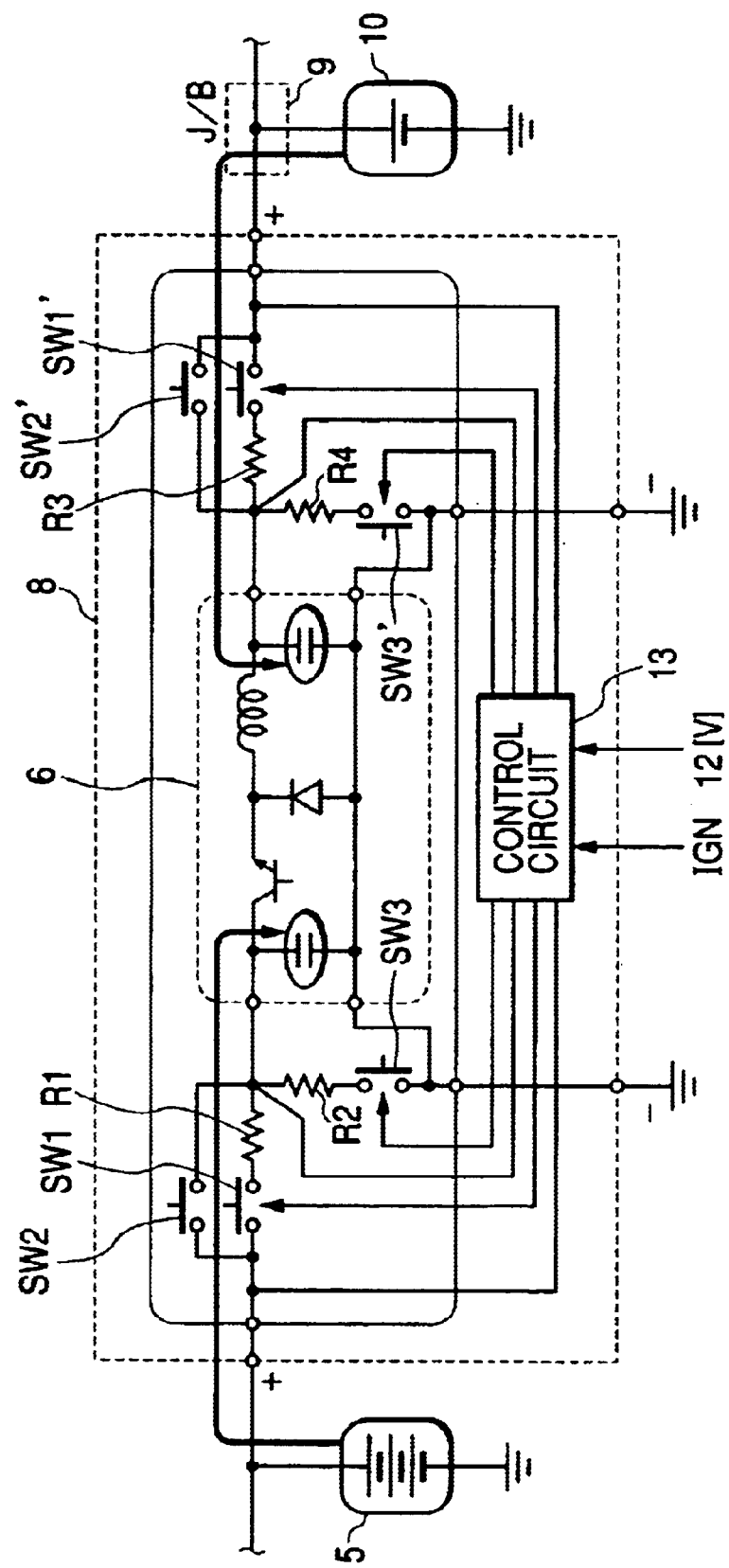
FIG. 3 is a diagram showing flows of currents immediately after 36-volt and 12-volt circuits are connected to the DC/DC converter.

If VB≧Vth1 (YES in step ST2), the switch SW1 is turned on (step ST3). As a result, as shown in FIG. 3, the voltage output from the 36-volt battery 5 is applied to the capacitor C1 via the resistor R1 to start the charging of the capacitor C1. Similarly, the voltage output from the 12-volt battery 10 is applied to the capacitor C2 via the resistor R3 to start the charging of the capacitor C2.

Namely, in the initial charging process of the capacitors C1 and C2, the charging currents are flown through the respective resistors R1 and R3, and hence it is possible to prevent arc generation from occurring.

The charging voltage (the voltage of the point P2) VC is detected by the control circuit 13. The control circuit 13 compares the difference (VB−VC) between the voltage VB (the voltage of the point P1) and the voltage VC with a preset threshold (the second threshold) Vth2 (step ST4). In the same manner as the threshold Vth1, the value of the threshold Vth2 can be adequately changed in accordance with the kinds of the batteries, the DC/DC converter, and the system of the vehicle on which the apparatus is mounted.

Figure 4:
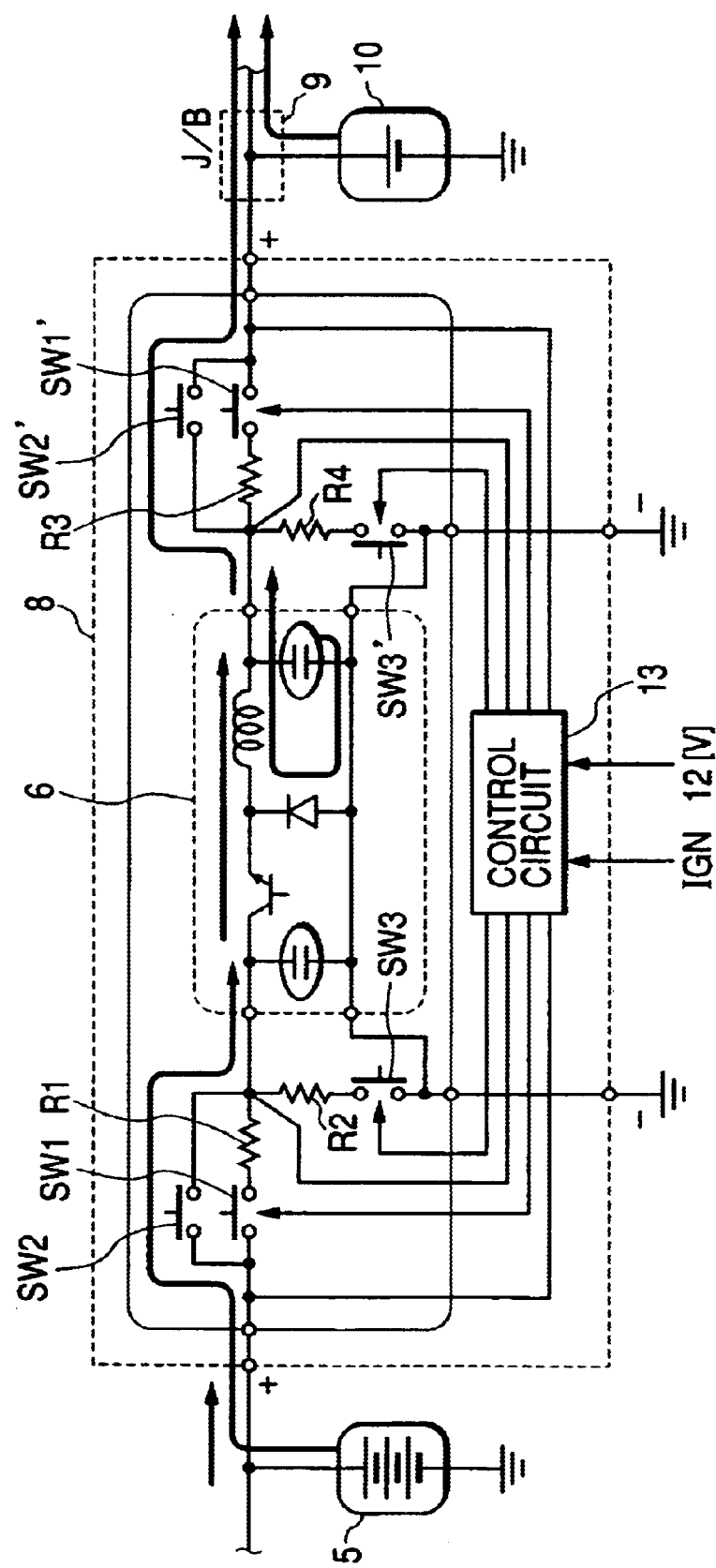
FIG. 4 is a diagram showing flows of currents in the case where the DC/DC converter is operated after the 36-volt and 12-volt circuits are connected to the DC/DC converter.

If Vth2≧(VB−VC) (YES in step ST4), the switch SW1 is turned off, and the switch SW2 is turned on (step ST5). Namely, as shown in FIG. 4, the circuit in which connection is performed via the resistor R1 is changed to the circuit in which the resistor R1 is removed away (the high-resistance circuit is replaced with a low-resistance circuit). As a result, the capacitors C1 and C2 can be fully charged, and the DC/DC converter 6 can convert the voltage of 36 volts into the voltage of 12 volts.

Figure 5:
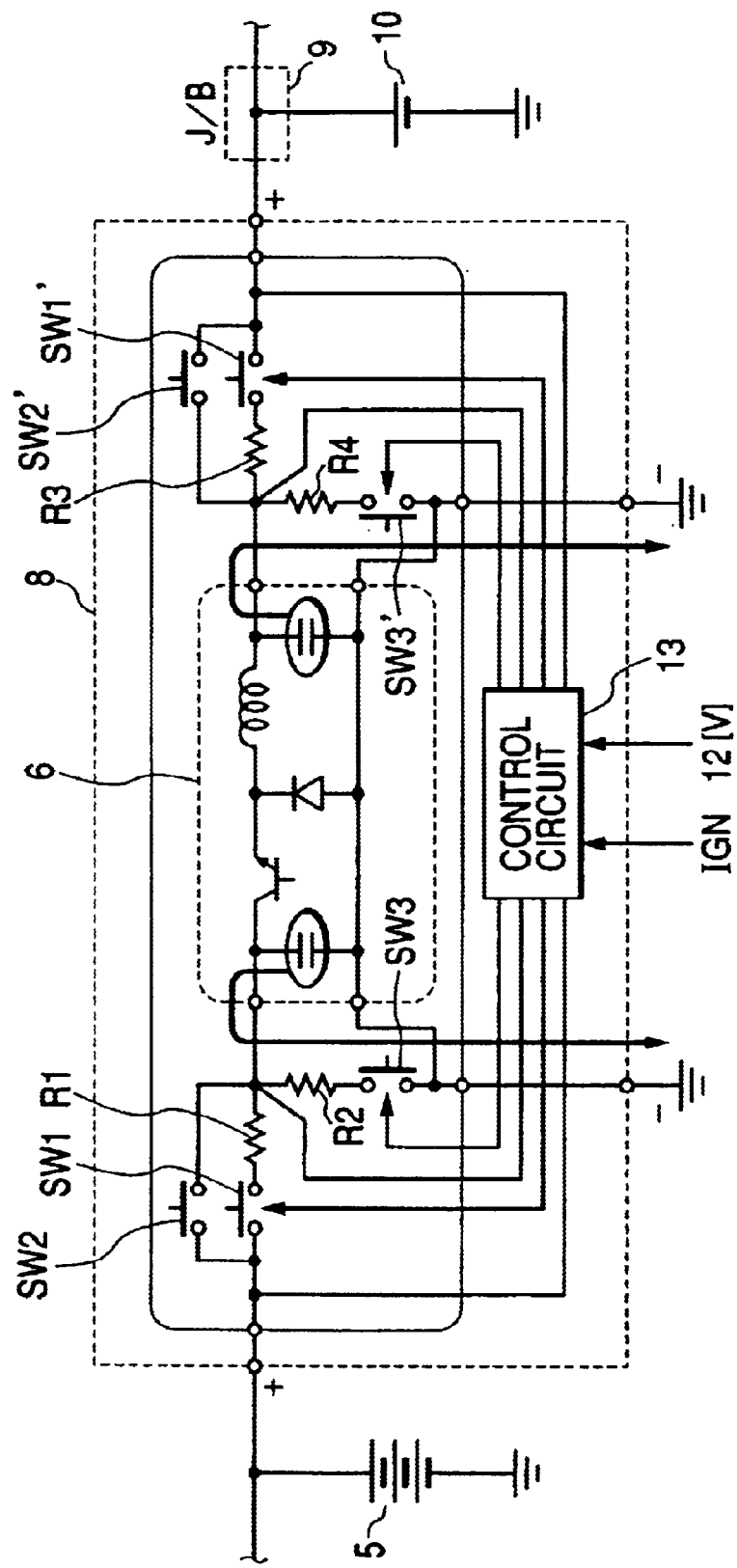
FIG. 5 is a diagram showing flows of currents in the case where the voltage accumulated in a capacitor is discharged after the 36-volt and 12-volt circuits are disconnected from the DC/DC converter.

When the ignition (IGN) of the vehicle is then turned off, the control circuit 13 detects this turning-off ("DETECTED" in step ST6), the switch SW2 is turned off, and the switch SW3 is turned on. As a result, the voltage supply from the 36-volt battery 5 is interrupted, and as shown in FIG. 5 the voltage charged in the capacitor C1 is discharged through the resistor R2. Similarly, the voltage charged in the capacitor C2 is discharged through the resistor R4. An LED (the informing unit) which is not shown is lit up to inform the operator that the capacitor C1 is being charged (step ST7).

Figure 6:
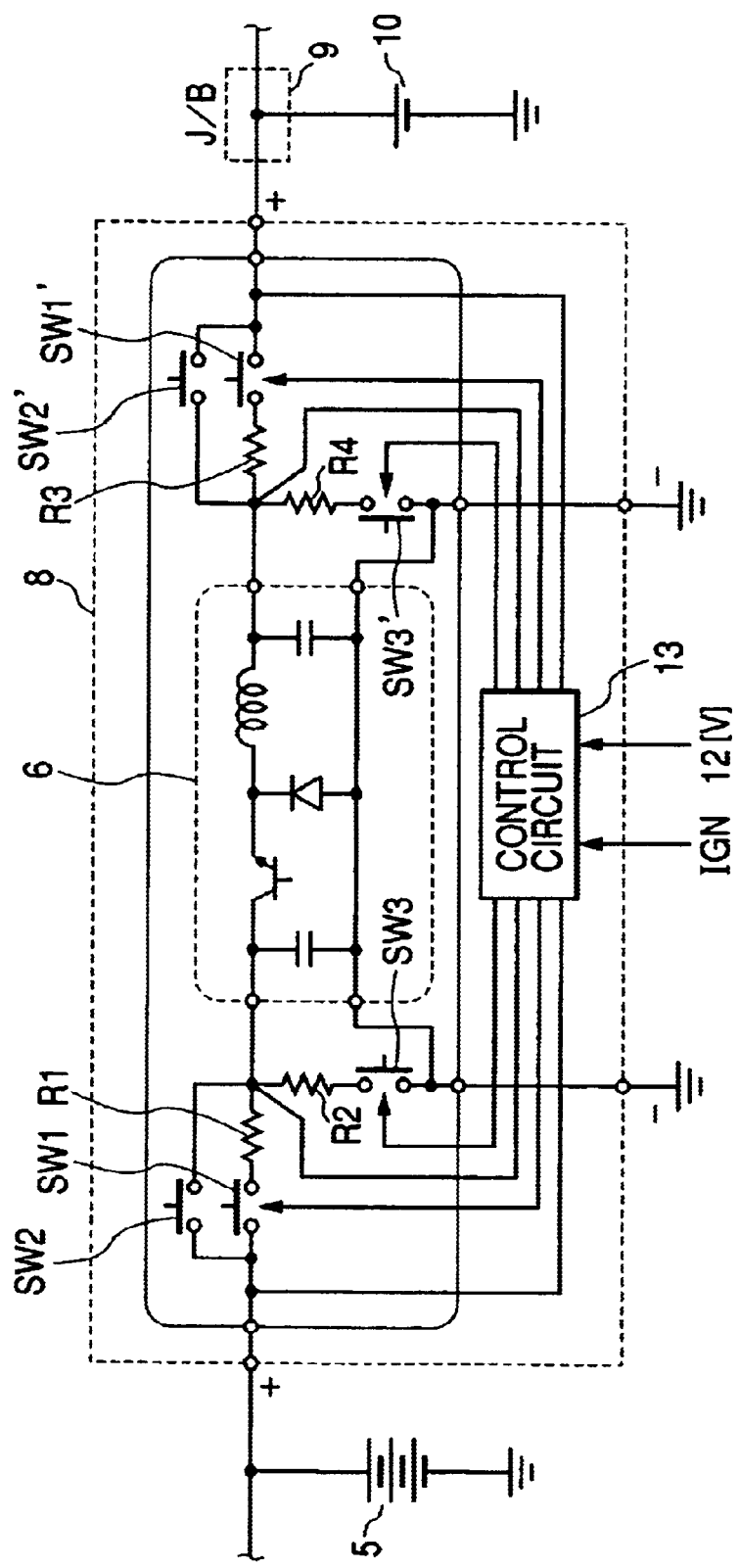
FIG. 6 is a diagram showing the state after the voltage accumulated in the capacitor is discharged.

Thereafter, the charging voltage (the voltage of the point P2) VC of the capacitor C1 is compared with a preset threshold Vth3 (the third threshold) (step ST8). If Vth3≧VB (YES in step ST8), as shown in FIG. 6, the switch SW3 is turned off and the LED is lit off (step ST9). In the same manner as the thresholds Vth1 and Vth2, the value of the threshold Vth3 can be adequately changed in accordance with the kinds of the batteries, the DC/DC converter, and the system of the vehicle on which the apparatus is mounted.

In this way, when the ignition is turned off, the connection between the 36-volt battery 5 and the DC/DC converter 6 can be interrupted, and the voltage charged in the capacitor C1 can be discharged. When the ignition-on signal is thereafter given, the process starting from step ST1 is repeated.

As described above, in the power supply apparatus 1 of the embodiment, when the battery is connected or the ignition is turned on, the switch SW1 is turned on at the timing when the battery voltage VB becomes equal to or lower than the threshold Vth1. The switch SW1 is turned off, and the SW2 is turned on at the timing when the difference (VB−VC) between the battery voltage VB and the charging voltage VC of the capacitor C1 becomes equal to or lower than the threshold Vth2.

When the power supply wire is connected to the circuitry, or when the ignition is turned on, flowing of an excessive current can be blocked, and arc generation can be prevented from occurring.

When the ignition is turned off, the voltage charged in the capacitor C1 is discharged. During maintenance of the parts of the power supply apparatus, therefore, the power supply through the power supply wire of the battery (particularly, from the 36-volt side) is completely interrupted, so that the work can be safely performed without paying much attention to the work sequence. Moreover, it is possible to avoid troubles such as arc generation due to disconnection of the power supply wire.

When the ignition is off, the state where the power supply wire of the battery is disconnected from the DC/DC converter 6 is obtained. Therefore, battery exhaustion can be prevented from occurring when the vehicle is not used for a long time period.

When it is configured so that the arc preventing circuits 12 are disposed inside the DC/DC converter 6, the number of components can be reduced, and the production cost can be lowered.

Second Embodiment

Next, a second embodiment of the invention will be described. In the above-described power supply apparatus 1 of the first embodiment, the operation states of the switches SW1 to SW3 and SW1' to SW3' are switched over in the software process by the control circuit 13. By contrast, in the embodiment, a similar process is performed by using a hardware configuration.

Figure 8:
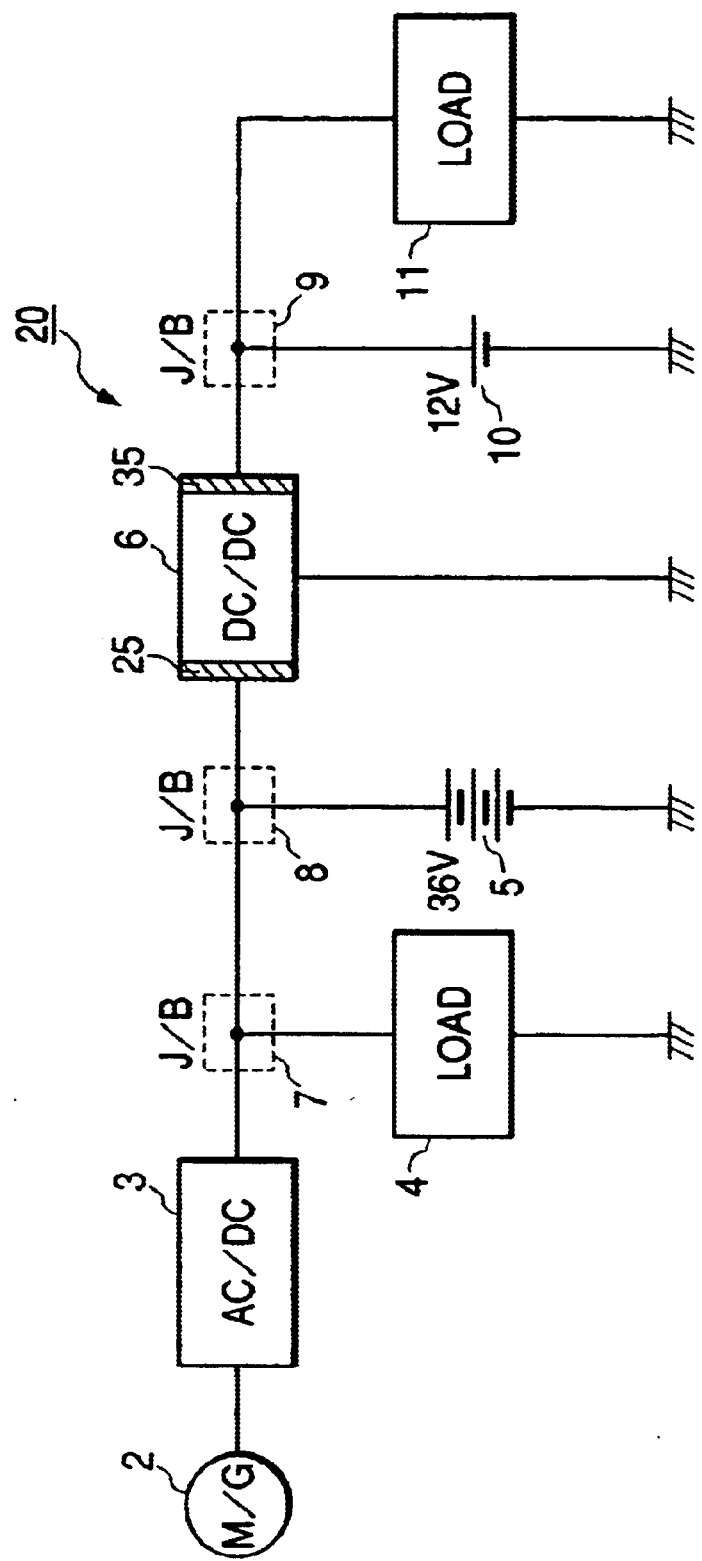
FIG. 8 is a block diagram showing the configuration of an in-vehicle electric power supply apparatus which is a second embodiment of the invention.

FIG. 8 is a block diagram showing the configuration of an in-vehicle electric power supply apparatus 20 of the second embodiment. The in-vehicle electric power supply apparatus 20 is configured in an approximately same manner as that shown in FIG. 1 except that the DC/DC converter 6 and the junction box 8 are separately disposed. In the embodiment, arc preventing circuits 25 and 35 are disposed inside the DC/DC converter 6.

Figure 9:
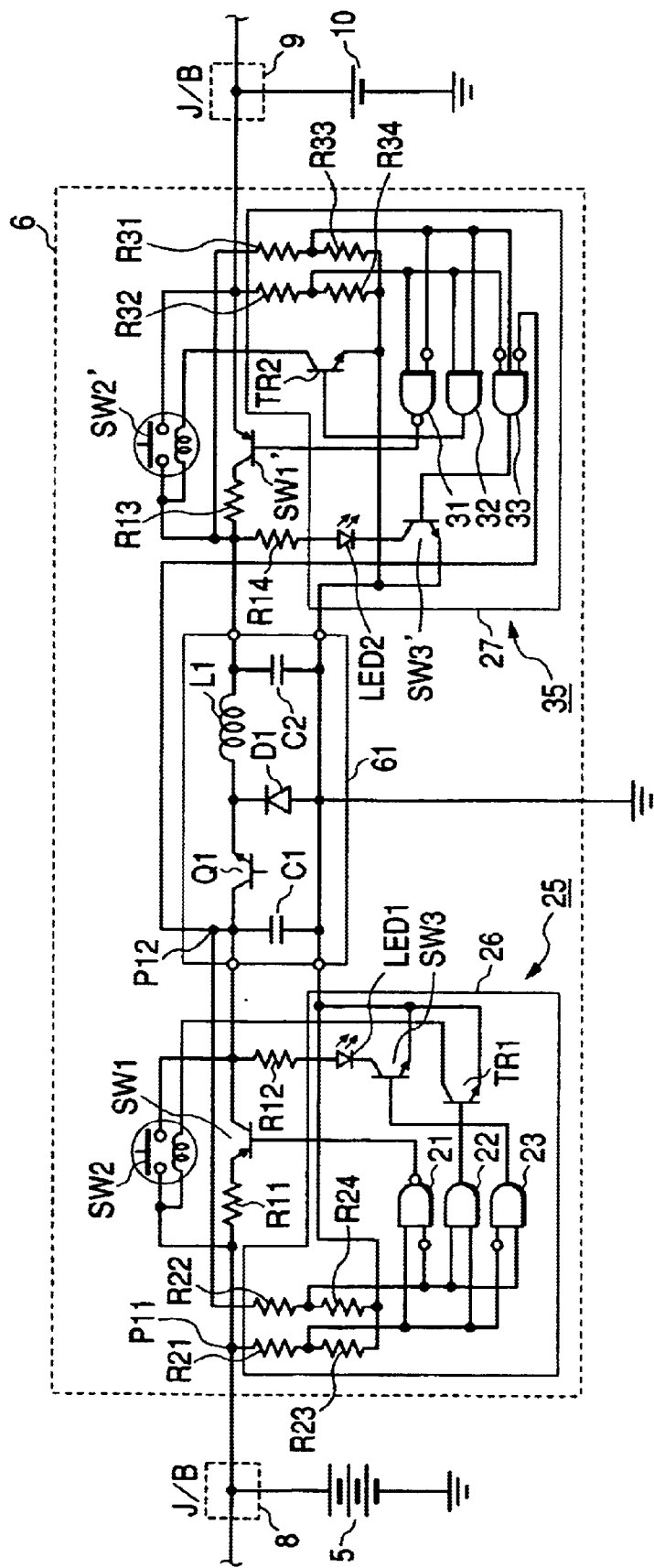
FIG. 9 is a circuit diagram showing in detail the configuration of a DC/DC converter in the in-vehicle electric power supply apparatus of the second embodiment.

FIG. 9 is a circuit diagram showing the configurations of a DC/DC converter circuit 61, and the arc preventing circuits 25 and 35 appendant to the DC/DC converter circuit 61. In the embodiment, these circuits are generally referred to as the DC/DC converter 6.

The DC/DC converter circuit 61 shown in the figure is configured in the same manner as the DC/DC converter 6 shown in FIG. 2, and comprises the capacitors C1 and C2, the transistor Q1, the choke coil L1, and the diode D1.

The arc preventing circuit 25 is disposed between the junction box 8 and the DC/DC converter circuit 61. The arc preventing circuit 25 has: a series circuit of a resistor R11 (the first resistor) and the switch SW1 (the first switch) configured by a transistor; a relay switch SW2 (the second switch) which is disposed in parallel with the series circuit; and a control circuit 26.

The control circuit 26 comprises: resistors R21 and R23 which divide the battery voltage; resistors R22 and R24 which divide the charging voltage of the capacitor C1; three AND circuits 21, 22, and 23; a switch SW3 (the third switch); a transistor TR1; and a light emitting diode LED1. The circle marks indicated in the input and output sides of the AND circuits 21 and 23 indicate "NOT: inversion". A resistor R12 (the second resistor) is connected between the switch SW2 and the light emitting diode LED1.

The arc preventing circuit 35 is disposed between the junction box 9 and the DC/DC converter circuit 61. The arc preventing circuit 35 is configured in a substantially same manner as the arc preventing circuit 25, and comprises switches SW1' and SW2', resistors R13 and R14, and a control circuit 27. The control circuit 27 comprises: resistors R31 to R34 for voltage division; a switch SW3'; a light emitting diode LED2; a transistor TR2; and three AND circuits 31, 32, and 33.

The arc preventing circuit is different from the arc preventing circuit 25 in that one input terminal of the AND circuit 33 is connected to one terminal of the capacitor C1.

Figure 10:
FIG. 10 is a view showing correspondence relationships between the operations of switches shown in FIG. 9, and the state of the DC/DC converter.
Figure 11:
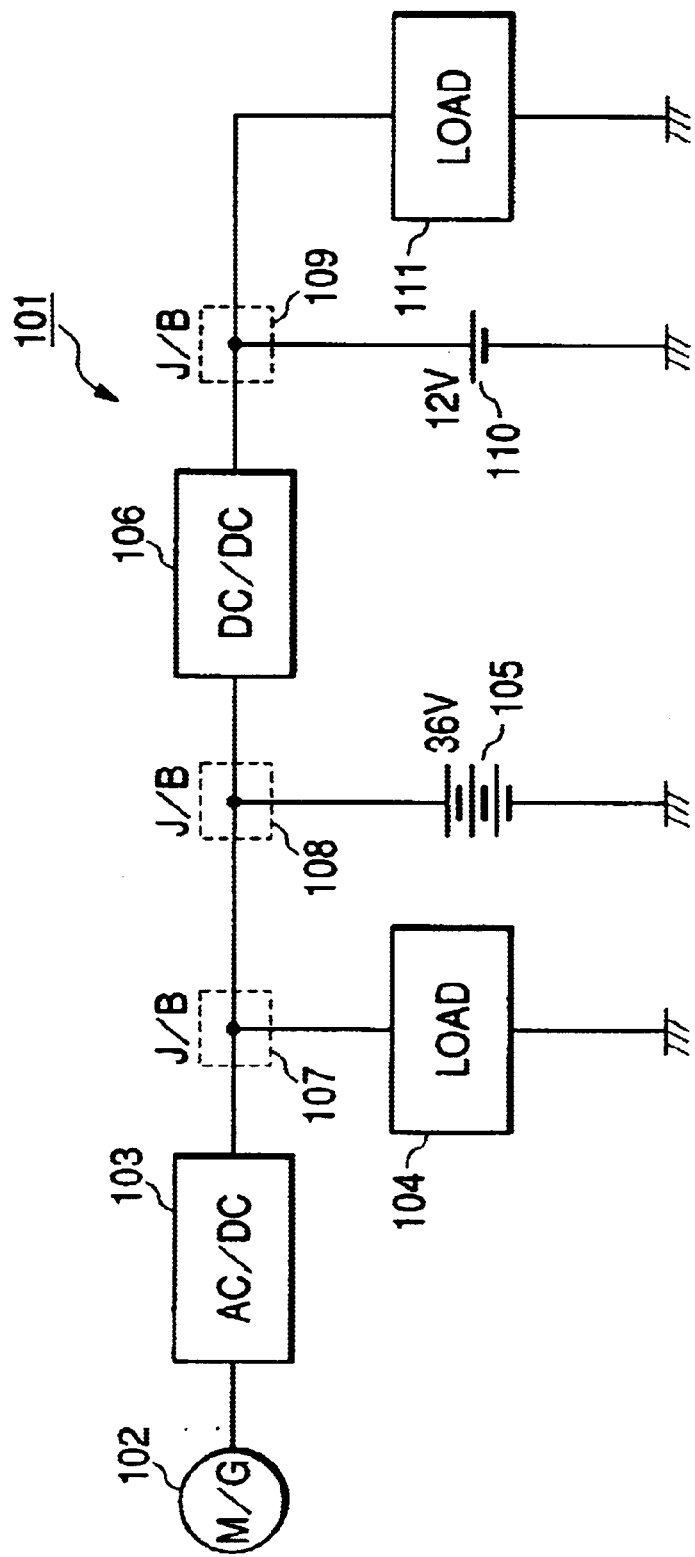
FIG. 11 is a block diagram showing the configuration of a conventional in-vehicle electric power supply apparatus.

FIG. 10 is a view showing the states of the DC/DC converter 6 and the on/off operations of the switches. Hereinafter, the operation of the embodiment will be described with reference to the figure.

In the case where a power supply wire of the junction box 8 is not yet connected to the DC/DC converter 6, both the battery voltage VB (the voltage of a point P11) and the charging voltage VC (the voltage of a point P12) of the capacitor C1 are 0 volt. Therefore, the two input signals of the AND circuit 21 are "H" and "L", respectively, and the output signal is "H" (L is inverted to H), so that the switch SW1 is turned off.

When the power supply wire of the junction box 8 is connected to the DC/DC converter 6, the voltage VB of the point P11 is raised to 36 volts. Therefore, the output signal of the AND circuit 21 is changed to "L", and the SW1 is turned on. As a result, the charging of the capacitor C1 is started.

Thereafter, the terminal voltage of the capacitor C1 is raised. When the voltage VC of the point P12 reaches a predetermined level, the voltage of the junction point of the resistors R22 and R24 is raised, so that the output signal of the AND circuit 21 is "H" and that of the AND circuit 22 is "H".

As a result, the switch SW1 is turned off, and the transistor TR1 is turned on, so that the coil of the switch SW2 is energized to turn on the switch SW2. Namely, a connection is performed through the resistor R11 immediately after the power supply wire of the junction box 8 is connected to the converter, and the connection is switched to that which is made without passing through the resistor R11. Therefore, arc generation can be prevented from occurring during a work of connecting the power supply wire.

When the power supply wire is disconnected from the DC/DC converter 6, the voltage VB of the point P11 is 0 volt immediately after the disconnection, and the charging voltage is accumulated in the capacitor C1 (namely, the voltage VC of the point P12 is in the high level). Therefore, the output signal of the AND circuit 23 is in "H" level, and the switch SW3 is turned on. As a result, the voltage accumulated in the capacitor C1 is discharged via the resistor R12, and the light emitting diode LED1 is lit on.

In a short time, the voltage at the point P12 becomes 0 volt, so that the output signal of the AND circuit 23 is "L" and the switch SW3 is turned off. As a result, the light emitting diode LED1 is lit off. In this way, during the work of disconnecting the power supply wire, the voltage accumulated in the capacitor C1 can be safely discharged.

As described above, in the in-vehicle electric power supply apparatus 20 of the second embodiment, arc generation can be prevented from occurring during a work of connecting or disconnecting the power supply wire in the same manner as the first embodiment, and hence a maintenance work and the like can be safely performed.

Although the in-vehicle electric power supply apparatus of the invention has been described in the illustrated embodiments, the invention is not restricted to the embodiments, the configurations of the components can be replaced arbitrary ones having a similar function.

In the embodiments, for example, the configuration in which the DC voltage of 36 volts is converted into the DC voltage of 12 volts by using the DC/DC converter has been described. The invention is not restricted to this, and may be applied to a configuration for other voltages.

As described above, in the in-vehicle electric power supply apparatus of the invention, when the power supply wire of the power supply circuit (the high-voltage or low-voltage side) is to be connected to the DC/DC converter, the power supply wire is connected via the high-resistance circuit (a circuit having a higher resistance), and thereafter connected via the low-resistance circuit (a circuit having a lower resistance). Therefore, arc generation can be prevented from occurring during the work of connecting the power supply wire. When the power supply wire is to be disconnected from the DC/DC converter, the voltage charged in a capacitor of the converter is discharged, and hence arc generation can be prevented from occurring during the work of disconnecting the power supply wire. Therefore, it is possible to enhance the safety during works of mounting and dismounting the DC/DC converter to and from a vehicle.

What is claimed is:

1. An in-vehicle electric power supply apparatus comprising:
   a DC/DC converter including a capacitor for charging for voltage conversion;
   a power supply circuit disposed on a high-voltage side of the DC/DC converter;
   a power supply circuit disposed on a low-voltage side of the DC/DC converter;
   at least one arc preventing unit disposed between the DC/DC converter and at least one of the power supply circuits, which includes a high-resistance circuit having a first resistance and a low-resistance circuit having a second resistance lower than the first resistance, wherein when the DC/DC converter and the one of the power supply circuits are to be connected to each other, the arc preventing unit is controlled so that the DC/DC converter and the one of the power supply circuits are connected each other through the high-resistance circuit and then through the low-resistance circuit, and wherein when the DC/DC converter and the one of the power supply circuits are to be disconnected from each other, the arc preventing unit is controlled so that the DC/DC converter discharges a charging voltage of the capacitor of the DC/DC converter.

2. The in-vehicle electric power supply apparatus according to claim 1, wherein a resistance value of the second resistance is substantially 0.

3. An in-vehicle electric power supply apparatus comprising:

a DC/DC converter including a capacitor for charging for voltage conversion;

a power supply circuit disposed on a high-voltage side of the DC/DC converter;

a power supply circuit disposed on a low-voltage side of the DC/DC converter; and at least one arc preventing unit disposed between the DC/DC converter and at least one of the power supply circuits, the arc preventing unit including, a first circuit formed by a series connection of a first switch and a first resistor, a second switch which is connected in parallel with said first circuit, a second circuit which is formed by a series circuit of a third switch and a second resistor, and is connected across terminals of the capacitor of the DC/DC converter; and a controlling unit for, when the DC/DC converter and the one of the power supply circuits are to be connected to each other, controlling the first switch to be turned on, and then controlling the first switch to be turned off and the second switch to be turned on, and for, when the DC/DC converter and the one of the power supply circuits are to be disconnected from each other, controlling the second switch to be turned off and the third switch to be turned on.

4. The in-vehicle electric power supply apparatus according to claim 3, wherein the controlling unit controls the first switch to be turned on when a first voltage which is applied to a connection terminal of the DC/DC converter is equal to or higher than a first threshold after the connection terminal of the DC/DC converter is connected to an output terminal of the power supply circuit, and the controlling unit controls the first switch to be turned off, and the second switch to be turned on when a difference between the first voltage and a terminal voltage of the capacitor of said DC/DC converter is equal to or lower than a second threshold.

5. The in-vehicle electric power supply apparatus according to claim 3, wherein when a vehicle ignition is turned off, the controlling unit controls the second switch to be turned off, and then controls the third switch to be turned on.

6. The in-vehicle electric power supply apparatus according to claim 5, wherein when the terminal voltage of the capacitor of the DC/DC converter is equal to or lower than a third threshold after the third switch is turned on, the controlling unit controls the third switch to be turned off.

7. The in-vehicle electric power supply apparatus according to claim 6 further comprising an informing unit for informing of the turn-on state when the third switch is turned on.

* * * * *